United States Patent [19]

Edwards et al.

[11] 4,105,742

[45] Aug. 8, 1978

[54] SEPARATION AND PURIFICATION OF PLATINUM AND PALLADIUM

[75] Inventors: Roderick I. Edwards, Honeydew; Michael J. Nattrass, Randburg, both of South Africa

[73] Assignee: The National Institute for Metallurgy, South Africa

[21] Appl. No.: 806,816

[22] Filed: Jun. 15, 1977

[30] Foreign Application Priority Data

Jun. 21, 1976 [ZA] South Africa ................... 76/3679

[51] Int. Cl.$^2$ ............................................. C01G 55/00
[52] U.S. Cl. ................... 423/22; 75/101 BE
[58] Field of Search .......................... 433/22, 658.5; 75/101 BE, 121, 97 R

[56] References Cited

U.S. PATENT DOCUMENTS

| 3,437,431 | 4/1969 | Platz et al. ................ 423/22 |
| 3,960,549 | 6/1976 | MacGregor ................ 75/121 |
| 3,967,956 | 7/1976 | Payne ........................ 423/22 |
| 4,041,126 | 8/1977 | Baltz ...................... 75/101 BE |

*Primary Examiner*—Herbert T. Carter
*Attorney, Agent, or Firm*—Cushman, Darby & Cushman

[57] ABSTRACT

A process for the separation of platinum and/or palladium from acid starting solutions containing the chlorocomplexes thereof together with other platinum group metals and/or base metals in 0.01 to 2M acid solutions comprises contacting the starting solution with a suitable solvent extractant; the solvent extractant being substantially water insoluble, carried in an organic phase and comprising functional groups of the formula $R_2N-CH_2-COOH$ wherein R is a long-chain alkyl group and thereafter separating the two phases and recovering the extracted platinum or palladium or both from the loaded solvent extractant.

9 Claims, No Drawings

SEPARATION AND PURIFICATION OF PLATINUM AND PALLADIUM

BACKGROUND OF THE INVENTION

This invention relates to the separation and purification of platinum and palladium with particular reference to the removal of these metals from associated metals such as base metals, and other metals of the platinum group.

In this specification the term "base metal" is used to mean any impurity other than a member of the platinum group and gold.

Platinum and Palladium generally occur in nature in ores which contain further platinum group metals, silver gold and base metals. Well known processes are used to produce a concentrate having a platinum group metal concentration of at least 5% by mass. Treatment of these concentrates usually includes the following consecutive basic steps:

1. The concentrate is leached in hydrochloric acid using chlorine or nitric acid to oxidise the Platinum group metals. This dissolves much of the base metal content, and most of the gold, silver, platinum and palladium, while a large proportion of the secondary platinum group metals (i.e. Rh, Rh, Ir and Os) and the more refractory Pt, Pd and Au fractions are left in the leach residue. Processes for recovery of the platinum group metal content of the residue are generally long and complicated.

2. A reductant is used to precipitate gold as the metal which is then removed from the leach liquor by filtration.

3. An impure salt, ammonium chloroplatinate, $(NH_4)_2PtCl_6$, is then precipitated and removed by filtration. The palladium is subsequently precipitated, usually as the dichloro diammino complex $Pd(NH_3)_2Cl_2$.

4. Both the platinum and palladium precipitates are impure and are purified by further operations including, in the case of platinum, the calcination of the impure salt to metal, and the dissolution thereof in an oxidising, acid medium prior to purification.

These purification steps involve further losses of Pt and Pd so that the single-pass recovery for both metals is quite low and extensive amounts of material must be recycled.

The problem of incomplete and non-dissolution of some of the platinum group metals has been solved to a large extent by the process disclosed in our U.S. application Ser. No. 652,283, now abandoned.

This process involves alloying the platinum group metal concentrate with aluminium and the subsequent formation of a leach liquor containing the majority of the platinum group metal content of the alloy.

Processes for the separation of the various metals from such a liquor and from each other are known but are generally inefficient and not sufficiently selective. In the case of Pt and Pd, a basis for an improved separation process lies in the greater tendency of these metals to form anionic chlorocomplexes than the associated base metals and other platinum group metals to form such complexes. Attempts have been made to exploit this difference in behaviour by using anion-exchange resins and solvents. Typical examples are the use of tertiary amines e.g. Alamine 310, (a General Mills Inc. product sold under the Trade Mark "Alamine"), and a very weak base solvent extractant such as tributyl-phosphate. These anion exchanges do indeed have fairly high selectivity but all have associated with them serious disadvantages which render their use on a large-scale impractical.

These difficulties are different in each case but can be summarised as follows:

a. The solvents or resins, while extracting Pt and Pd are difficult to strip in practice. This applies to extractants such as Alamine 310.

b. Where the solvents can be easily stripped e.g. tributyl-phosphate (TBP) their capacity and distribution coefficient on extraction are very low.

c. Solvents such as primary and secondary amines can also be used and their capacity and distribution coefficients are between that of TBP and those of tertiary amines. Compounds such as these, however, have a tendency to form complexes with the extracted metal by the following type of reaction:

(i) Extraction takes place according to the reaction:

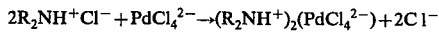

$$2R_2NH^+Cl^- + PdCl_4^{2-} \rightarrow (R_2NH^+)_2(PdCl_4^{2-}) + 2Cl^-$$

(ii) Complex formation takes place according to the reaction:

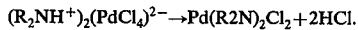

$$(R_2NH^+)_2(PdCl_4)^{2-} \rightarrow Pd(R_2N)_2Cl_2 + 2HCl.$$

The ion pair formed in reaction (i) can be destroyed by stripping with, for example, a strong hydrochloric acid solution but the complex formed in reaction (ii) cannot be so destroyed. This means that the extractants become poisoned at a rate unacceptable for commercial use.

Added to these difficulties is the fact that while a large measure of purification from base matals and secondary platinum group metals is achieved, sufficient of these are coextracted to render further purification necessary.

It is thus an object of this invention to provide a solvent having the following characteristics:

1. A high capacity and distribution coefficient for both platinum and palladium under suitable loading conditions, 2. An ability to be stripped of platinum or palladium or both by simple means, 3. A sufficiently high selectivity for platinum or palladium or both so that the strip liquor is pure enough to allow production of either pure platinum or palladium or a mixture thereof after separation of these metals and, 4. A high resistance to complex formation whereby irreversible extraction occurs.

DETAILED DESCRIPTION OF THE INVENTION

According to the invention a process for the separation of platinum and/or palladium from acid starting solutions containing the chlorocomplexes thereof together with other platinum group metals and/or base metals in 0.01 to 2M acid solutions comprises contacting the starting solution with a suitable solvent extractant; the solvent extractant being substantially water insoluble, carried in an organic phase and comprising functional groups of the formula $R_2N-CH_2-COOH$ wherein R is a long-chain alkyl group and thereafter separating the two phases and recovering the extracted platinum or both from the loaded solvent extractant.

Further according to the invention the starting solution may contain base metals; the recovery of the platinum and/or palladium may be effected by stripping the loaded solvent, and the long-chain alkyl group comprises a chain of from eight to sixteen carbon atoms and is optionally a branched chain alkyl group.

The suitability of solvents in the form of tertiary amino acids including a long chain alkyl group has been shown by experimentation.

It would be expected, from the structure of the molecules of the extractants of this invention that the anion-exchange behaviour of these compounds would closely resemble that of tertiary amines. However, the amino acids examined showed completely different behaviour, much more closely resembling amines than tertiary amines.

Thus while Pt, for example, is extremely difficult to strip from Alamine 310 (see above) with HCl, it can be stripped easily from both tertiary amino acids and secondary amines (provided that the complex formation in the latter case has not yet occurred which it always does at a faster or slower rate).

Palladium and gold behave similarly but anionic complexes having a negative charge equal to or greater than 3 are not extracted at any acid concentrations. Thus, under low acid concentration highly selective and effective extraction of Pt and Pd may be achieved, while a simple convenient method of stripping the solvent exists. The selectivity obtainable and the usefulness of the invention are further illustrated by the examples given below.

In all the examples the solvent used was a tertiary amino acid which was the acetic acid derivative of Amberlite LA-2, a commercial secondary amine manufactured by Rohm & Hass. This secondary amine is a branched chain dilauryl amine and was used because the alkyl chains attached to the nitrogen atom are well suited to give the necessary properties of low viscosity, water insolubility and miscibility with organic solvents such as Solvesso 150 (a commercial aromatic solvent manufactured by Esso Chemicals).

The amine was then reacted with chloroacetic acid in the presence of sodium hydroxide in an alcohol solution. Such syntheses are well known and simple to perform and stoichiometric quantities can be used to give very high yields of product.

Finally the prepared solvent extracted was washed with water to remove reaction products such as salt, and used as a 10% v/v solution is Solvesso 150 which is hereinafter referred to as the amino acid.

EXAMPLE 1

In this experiment the extraction behaviour of $Pt^{IV}$ in the form of the $PtCl_6^{2-}$ anion was studied in both the amino acid and a 10% solution of Alamine 310 in Solvesso 150. The extraction coefficient from HCl of various strengths was compared. The results obtained are listed below. The curves corresponding to the amino acid and to the Alamine 310 were calculated but are not shown herein.

| Acid concentration | D O/A (amino acid) | D O/A (Alamine 310) |
|---|---|---|
| 0,1 | $10^2$ | $10^3$ |
| 1,0 | 10 | $5 \times 10^2$ |
| 4,0 | 5 | $10^2$ |
| 8,0 | 1 | 50 |
| 10,0 | 0,1 | 15 |

The slope of the amino acid curve "$a$" is greater than that of the Alamine 310 "$b$" indicating that the solvent is more effectively stripped by strong acid than is the case for Alamine 310. Thus the ratio of the distribution coefficients between 0.1 M and 10 M is $10^3$ for the amino acid and $10^2$ for Alamine.

EXAMPLE 2

This example illustrates the superior selectivity of the amino acid solvent extractant over Alamine 310 for $Pt^{IV}$ in hydrochloric acid solution. A solution simulating a plant solution was made with the following composition:

| | |
|---|---|
| Pt | 20,5 g/l |
| Ru | 3,2 g/l |
| Rh | 1,5 g/l |
| Ir | 0,5 g/l |
| Cu | 4,1 g/l |
| Fe | 4,3 g/l |
| Ni | 2,7 g/l |
| Ag | 50 ppm |

This solution was initially made in 6 N HCl, boiled down to a low volume, and rediluted with water to give a final acid concentration of approximately 0.5 M HCl. $SO_2$ was then bubbled through the solution to reduce Ru and Ir to the trivalent oxidation states and the solution was divided into two batches, one of which was treated with the amino acid and the other with Alamine. The results of the extraction tests were as follows:

| | Alamine | Amino Acid |
|---|---|---|
| Pt Head (g/l) | 12,3 | 12,3 |
| 1st extraction ppm | 920 | 1450 |
| 2nd extraction ppm | 14 | 75 |
| 3rd extraction ppm | ND | 5 (where ND means "not detectable"). |

Thus in both cases high extraction efficiency is obtained but Alamine would in practice require fewer stages to achieve barren results than the amino acid.

The loaded organics were then stripped with concentrated (10 M) hydrochloric acid. 99% of the platinum was recovered from the amino acid in two strip stages; however, for Alamine only 75% was stripped in 6 strip stages.

The strip solutions were each concentrated and analysed for the metals present in the original solution. These analyses were:

| | Amino acid strip | Alamine strip |
|---|---|---|
| Pt (g/l) | 25,2 | 17,3 |
| Ru (ppm) | 5 | 37 |
| Rh (ppm) | 2 | 43 |
| Ir (ppm) | N.D. | 14 |
| Cu (ppm) | N.D. | 22 |
| Fe (ppm) | N.D. | 45 |
| Ni (ppm) | N.D. | N.D. (N.D. means "not detectable"). |
| Ag (ppm) | 6 | 14 |

Thus while the amino acid strip liquor was sufficiently pure for the production of pure platinum metal directly therefrom, the Alamine strip liquor would have required extensive further purification.

EXAMPLE 3

This example illustrates the use of the solvent at removing small amounts of Pt and Pd from a solution extremely rich in secondary platinum group metals. Under such circumstances tertiary amines such as Alamine cannot be used effectively because of the lower selectivity.

The solution used in the experiment was obtained from treating an intermediate product from a platinum group metal refinery in which the secondary platinum group metals are concentrated. Such materials are commonly produced in conventional platinum refineries as a result of retreatment of insolubles from the first leach carried out using HCl and an oxidant on a solid platinum group metal concentrate.

This solution contained the following elements in the following concentrations:

| | |
|---|---|
| Pt | 1,5 g/l |
| Pd | 600 ppm |
| Ru | 53 g/l |
| Rh | 17,2 g/l |
| Ir | 5,1 g/l |
| Cu | 950 ppm |
| Fe | 1500 ppm |
| Ni | 700 ppm |
| Ag | 50 ppm |

The solution was treated by the concentration—redilution—reduction technique as outlined in Example 2. 100 liters of the solution was then processed continuously through a pulsed packed solvent extraction column at an O/A ratio of 1/5 using a 10% solution of the amino acid in Solvesso 150 as the solvent extractant. The barren solution was analysed and found to contain: Pd — N.D. and Pt — 3 ppm.

The loaded organic was then washed with 0.5 M HCl in another solvent extraction column at a O/A ratio of 5/1. The washed solution was analysed and found to contain Pd — 50 ppm, Pt — 70 ppm, Ru — 90 ppm, Rh — 10 ppm and Ir — 25 ppm, i.e. the amount of platinum group metal in the head solution appearing in the wash was very low.

After washing the organic phase was stripped in the manner described above at an O/A ratio of 2/1 and the strip solution was analysed and found to contain

| | |
|---|---|
| Pt | 14,6 g/l |
| Pd | 8,70 g/l |
| Ru | 130 ppm |
| Rh | 20 ppm |
| Ir | 30 ppm |
| Ag | 10 ppm |
| Base metals - | all N.D. |

Thus the platinum and palladium content of the strip liquor is in excess of 99% of the total platinum group metal content of the strip liquor, whereas they represented about 3% of the platinum group metal content of the feed liquor. This strip solution is suitable for recycle to the main Pt/Pd stream, and, at the same time sufficient purification of the secondary platinum group metal solution from Pt and Pd has been achieved to prevent contamination of Ru, Ir and Rh by these elements.

EXAMPLE 4

In an experiment similar to that in Example 3 a different intermediary product from a platinum refinery was treated to produce a solution containing:

| | |
|---|---|
| Pt | 8,5 g/l |
| Pd | 26,2 g/l |

-continued

| | |
|---|---|
| Ru | 37,3 g/l |
| Rh | 17,6 g/l |
| Ir | 5,3 g/l |
| Ag | 150 ppm |
| Cu, Ni, Fe | 2000 ppm each. |

200 liters of this solution were processed as described in Example 3 except that the O/A ratios were altered to take account of the higher concentrations of Pt and Pd. Wash solutions were in this case recycled so that only a barren solution and a strip solution were produced. The barren solution was found to contain Pd — 2 ppm and Pt — 3 ppm.

The strip solution was concentrated and analysed with the following results:

| | |
|---|---|
| Pt | 70 g/l |
| Pd | 216 g/l |
| Ru | 240 ppm |
| Ir | 30 ppm |
| Rh | 40 ppm |
| Ag | 500 ppm |
| base metals all N.D. | |

This solution was then further processed as follows:

1. Pd was extracted down to 2 ppm with di-n-hexyl sulphide as described in U.S. application Ser. No. 600,940.

The loaded Pd solvent was stripped and the strip liquor processed to give a palladium metal sponge of purity greater than 99.95%.

2. The Pt containing solution was then evaporated down and rediluted thus precipitating the silver and the solution then filtered. Ascorbic acid was added to reduce Ir and Ru to the trivalent oxidation states and the platinum precipitated by adding ammonium chloride. This salt was filtered and calcined to produce a metal sponge containing the following impurities :

| | |
|---|---|
| Pd | 10 ppm |
| Rh | 22 ppm |
| Ir | 15 ppm |
| Ru | 27 ppm |
| Ag | 5 ppm |

Thus platinum metal of acceptable purity can be produced by a very simple route in high yield.

What we claim as new and desire to secure by Letters Patent is:

1. A process for the selective separation of platinum, palladium or both from an aqueous acid solution thereof, wherein the platinum and palladium are present in the form of the chlorocomplexes thereof, the solution being substantially gold free and having an acid concentration of about 0.01 to about 2 molar, the process including the steps of:

(1) contacting said solution with an organic solvent extractant solution which is substantially water insoluble to form an aqueous phase and an organic phase, the solvent extractant solution consisting essentially of an organic liquid solvent having dissolved therein a solvent extractant having functional groups of the formula:

$R_2N-CH_2COOH$ were each R, which may be the same or different, is a $C_8-C_{16}$ alkyl group, said solvent extract having a high capacity and distribution coefficient for both platinum and palladium, facilitating transfer of the platinum chlorocomplex and palladium chlorocomplex to the solvent extractant solution:

(2) separating the solvent extractant solution as an organic phase from the aqueous solution phase;

(3) contacting the thus separated organic solvent extractant solution with a concentrated aqueous hydrochloric acid solution transferring the platinum and palladium to the aqueous hydrochloric acid solution; and thereafter, (4) recovering the platinum and palladium from the aqueous acid solution.

2. A process as claimed in claim 1 in which the hydrochloric acid solution is about 10 M HCl.

3. A process as claimed in claim 1 in which the solvent extractant is the acetic acid derivative of dilauryl secondary amine.

4. A process as claimed in claim 1 in which any ruthenium and iridium present in the starting aqueous solution is, prior to step (1), reduced to their trivalent oxidation state.

5. A process as claimed in claim 4 in which the ruthenium and iridium present are reduced by bubbling sulphur dioxide through the solution.

6. A process as claimed in claim 1 in which both platinum and palladium are present in the starting solution and palladium is selectively recovered from the aqueous solution resulting from step (4) by contacting that aqueous solution with a solvent extractant solution comprising di-n-hexyl sulphide dissolved in an organic solvent, separating the aqueous solution from the solvent extraction solution and recovering the palladium from the solvent extractant solution.

7. A process for the separation of platinum, palladium or both platinum and palladium from an acid aqueous solution thereof wherein the platinum and palladium present are in the form of their chlorocomplexes and wherein the solution is substantially gold free and optionally contains impurity amounts of platinum group metals other than platinum and palladium, and base metals, said process comprising the steps of:

(1) adjusting the acid concentration of the chlorocomplex containing solution to a value of about 0.01 to about 2 molar;

(2) contacting the solution with a solvent extractant solution which is substantially water insoluble and comprises an organic liquid solvent in which is dissolved a solvent extractant having functional groups of the formula $R_2N-CH_2-COOH$ and wherein each R, which may be the same or different, is an alkyl group, said solvent extraction being substantially water insoluble providing for transfer of the platinum and palladium into the solvent extractant solution;

(3) separating the solvent extractant solution from the aqueous solution;

(4) contacting the solvent extractant solution with an aqueous acid solution thereby transferring the platinum and palladium into the aqueous acid solution; and, (5) recovering the platinum and palladium from the aqueous acid solution.

8. A process as claimed in claim 7 in which concentrated aqueous hydrochloric acid solution is used in step (4).

9. A process as claimed in claim 7 in which each R is an alkyl group having from about 8 to about 16 carbon atoms.

* * * * *